(12) United States Patent
D'Sidocky et al.

(10) Patent No.: US 8,388,784 B2
(45) Date of Patent: Mar. 5, 2013

(54) METHOD FOR RETREADING A TIRE

(75) Inventors: Richard Michael D'Sidocky, Ravenna, OH (US); Richard Alan Thomas, Hartville, OH (US); John Marius Argenzia, Jr., North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 559 days.

(21) Appl. No.: 12/342,378

(22) Filed: Dec. 23, 2008

(65) Prior Publication Data
US 2010/0154947 A1 Jun. 24, 2010

(51) Int. Cl.
*B29D 30/54* (2006.01)
*B29D 30/62* (2006.01)
*B29C 47/10* (2006.01)

(52) U.S. Cl. .................. 156/96; 156/244.11
(58) Field of Classification Search .............. 156/96, 156/244.11
See application file for complete search history.

(56) References Cited

U.S. PATENT DOCUMENTS

| | | | |
|---|---|---|---|
| 1,434,892 A | | 11/1922 | Harrison et al. |
| 1,869,657 A | * | 8/1932 | Bowers .............. 524/189 |
| 3,136,673 A | | 6/1964 | Carver ................ 156/96 |
| 3,513,139 A | * | 5/1970 | Coran et al. ........ 524/512 |
| 3,708,379 A | * | 1/1973 | Flint .................... 428/58 |
| 3,976,530 A | * | 8/1976 | Callan .............. 156/244.24 |
| 5,292,579 A | | 3/1994 | Kitayama et al. |
| 5,458,727 A | * | 10/1995 | Meyer ............... 156/405.1 |
| 5,503,940 A | | 4/1996 | Majumdar et al. ....... 428/492 |
| 6,120,911 A | | 9/2000 | Beers et al. ............ 418/457 |
| 6,186,202 B1 | | 2/2001 | Majumdar et al. ...... 152/209.6 |
| 6,330,984 B1 | | 12/2001 | Barker et al. ........... 242/536 |
| 6,341,771 B1 | | 1/2002 | Sasson, Jr. ............ 270/39.05 |
| 6,719,236 B1 | | 4/2004 | Douglas et al. ......... 242/536 |
| 6,808,579 B1 | | 10/2004 | Pulford et al. ............. 156/96 |
| 2001/0031836 A1 | * | 10/2001 | Datta et al. ............ 525/332.6 |
| 2002/0151640 A1 | | 10/2002 | Datta et al. |
| 2005/0187365 A1 | | 8/2005 | Gronowski et al. |
| 2005/0211351 A1 | | 9/2005 | Majumdar et al. ........ 152/154.2 |

FOREIGN PATENT DOCUMENTS

EP 0 168 188 A2 1/1986

OTHER PUBLICATIONS

Science & Technology of Rubber, 1994.
Non-Final Office Action, dated Jul. 26, 2011, U.S. Appl. No. 12/342,247.

* cited by examiner

*Primary Examiner* — Michael Tolin
(74) *Attorney, Agent, or Firm* — John D. DeLong

(57) ABSTRACT

The present invention is directed to a method of retreading a pneumatic tire, comprising the steps of: A) mixing a tire retread cushion laminate of to form a cushion compound, the tire retread cushion laminate comprising a first rubber layer, a second rubber layer, and an intermediate rubber layer disposed between the first and second rubber layers such that the first and second rubber layers do not meet; the first rubber layer comprising a sulfur donor and substantially devoid of vulcanization accelerators; the second rubber layer comprising a vulcanization accelerator and substantially devoid of sulfur donors; the intermediate rubber layer being substantially devoid of sulfur donors or vulcanization accelerators; B) applying the cushion compound to a tire carcass; and C) applying a tread portion to the cushion compound.

12 Claims, 3 Drawing Sheets

METHOD FOR RETREADING A TIRE

BACKGROUND OF THE INVENTION

Retreaded tires are typically prepared, for example, by applying a pre-cured rubber tread to a circumferential uncured rubber layer, sometimes referred to as a "cushion layer," which overlays a buffed tire rubber carcass from which the original rubber tread has been removed by abrading it away, to form an assembly thereof and the assembly cured at an elevated temperature to form a cured retreaded rubber tire. Such tire retreading process is well known to those having skill in such art.

It is desirable for a cushion layer compound to have a short cure time and a long scorch time. Conventionally, productive cushion layer compounds, i.e. compounds that are capable of curing, are made in a Banbury mixer that generates heat in the compound during mixing. The compounds are then stored and subjected to further heat history during shaping of the compound by extrusion or calendering. The extruded or calendered compound may be stored prior to application of the cushion layer to the tire to be retreaded. During the mixing, shaping and storing the cushion layer compound may experience some reaction of the curatives, leading to a shorter shelf life for the compound.

It would therefore be advantageous to have a cushion layer compound capable of maintaining a longer shelf life.

SUMMARY OF THE INVENTION

The present invention is directed to a method of retreading a pneumatic tire, comprising the steps of:

A) mixing a tire retread cushion laminate of to form a cushion compound, the tire retread cushion laminate comprising a first rubber layer, a second rubber layer, and an intermediate rubber layer disposed between the first and second rubber layers such that the first and second rubber layers do not meet;

the first rubber layer comprising a sulfur donor and substantially devoid of vulcanization accelerators;

the second rubber layer comprising a vulcanization accelerator and substantially devoid of sulfur donors;

the intermediate rubber layer being substantially devoid of sulfur donors or vulcanization accelerators;

B) applying the cushion compound to a tire carcass; and

C) applying a tread portion to the cushion compound.

The invention is further directed to a pneumatic tire retreaded by the methods of the present invention.

DETAILED DESCRIPTION OF THE INVENTION

There is disclosed a method of retreading a pneumatic tire, comprising the steps of:

A) mixing a tire retread cushion laminate of to form a cushion compound, the tire retread cushion laminate comprising a first rubber layer, a second rubber layer, and an intermediate rubber layer disposed between the first and second rubber layers such that the first and second rubber layers do not meet;

the first rubber layer comprising a sulfur donor and substantially devoid of vulcanization accelerators;

the second rubber layer comprising a vulcanization accelerator and substantially devoid of sulfur donors;

the intermediate rubber layer being substantially devoid of sulfur donors or vulcanization accelerators;

B) applying the cushion compound to a tire carcass; and

C) applying a tread portion to the cushion compound.

There is further disclosed a pneumatic tire retreaded by the methods of the present invention.

Figure 1:
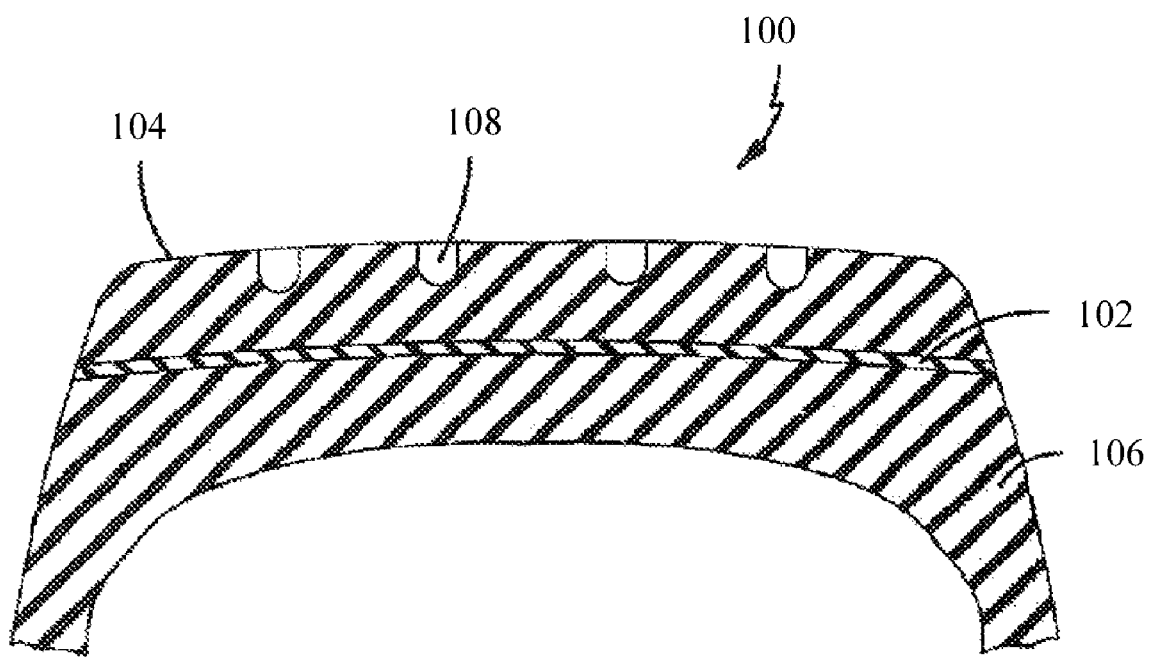
FIG. 1 shows a cross-sectional view of a retreaded tire.

FIG. 1 illustrates a tire 100 after retreading. In the retreaded tire 100, cushion layer 102 is used as the "adhesive" which holds the pre-cured tread 104 onto the buffed carcass 106. The precured tread may be defined by any combination of horizontal or lateral grooves 108. Conventionally, the cushion gum 102 is mixed in a centralized plant and shipped in refrigerated trucks to small retreading shops, where it is stored for a period of time. The cushion gum 102 must have a shelf life of at least several months. In the present invention, rather than using a premixed retread cushion compound, a retread cushion laminate is used. The retread cushion laminate includes at least three layers, a first rubber layer, a second rubber layer, and an intermediate rubber layer disposed between the first and second rubber layers such that the first and second rubber layers do not meet. Generally, the first and second layers are each formed from rubber compositions containing curatives. However, the separation of curatives into the first and second layers is such that vulcanization of the rubber compositions will not take place until the first and second layers are blended together. The intermediate layer is disposed between the first and second layers to impede migration of curatives from the first to second layer or vice versa.

The curatives to be separated into the first and second layers include sulfur donors and vulcanization accelerators. The first layer contains a sulfur donor and is substantially free of vulcanization accelerators. The second layer contains a vulcanization accelerator, and is substantially free of sulfur donors. The intermediate layer is substantially free of sulfur donors and accelerators. By substantially free, it is meant that any existing amount of vulcanization accelerator in the first layer, or sulfur donor in the second layer, or either sulfur donor or vulcanization accelerator in the intermediate layer, is vanishingly small so as not to appreciably effect vulcanization of the rubber before the first, intermediate, and second layers are mixed. It is to be understood that owing to residual impurities in processing equipment and typical impurity levels in technical grade chemicals, some low level of sulfur donor (in the second layer) or accelerator (in the first layer) may be present. In one embodiment, the amount of sulfur donor in the second layer is less than 0.1 phr. In one embodiment, the amount of accelerator in the first layer is less than 0.1 phr.

The first layer, then contains a sulfur donor. Representative examples of sulfur donors include elemental sulfur (free sulfur), an amine disulfide, polymeric polysulfide and sulfur olefin adducts. The amount of sulfur donor in the first layer is set such that the amount of sulfur in the cushion compound, after mixing of the retread cushion laminate, is at the desired level for vulcanization.

The second layer contains a vulcanization accelerator. Suitable types of accelerators that may be used in the present invention are amines, disulfides, guanidines, thioureas, thiazoles, thiurams, sulfenamides, dithiocarbamates and xanthates. The amount of accelerator in the second layer is set such that the amount of accelerator in the cushion compound, after mixing of the retread cushion laminate, is at the desired level for vulcanization.

The intermediate layer is substantially devoid of sulfur donors or accelerators. In one embodiment, the intermediate layer includes a vulcanization inhibitor to inhibit vulcanization due to migration of sulfur donor or vulcanization inhibitor from their respective layers to the other layers.

The retread cushion laminate may be formed, for example, by co-extruding the three or more layers to produce an elongate cushion laminate of the desired cross-section.

Figure 2:
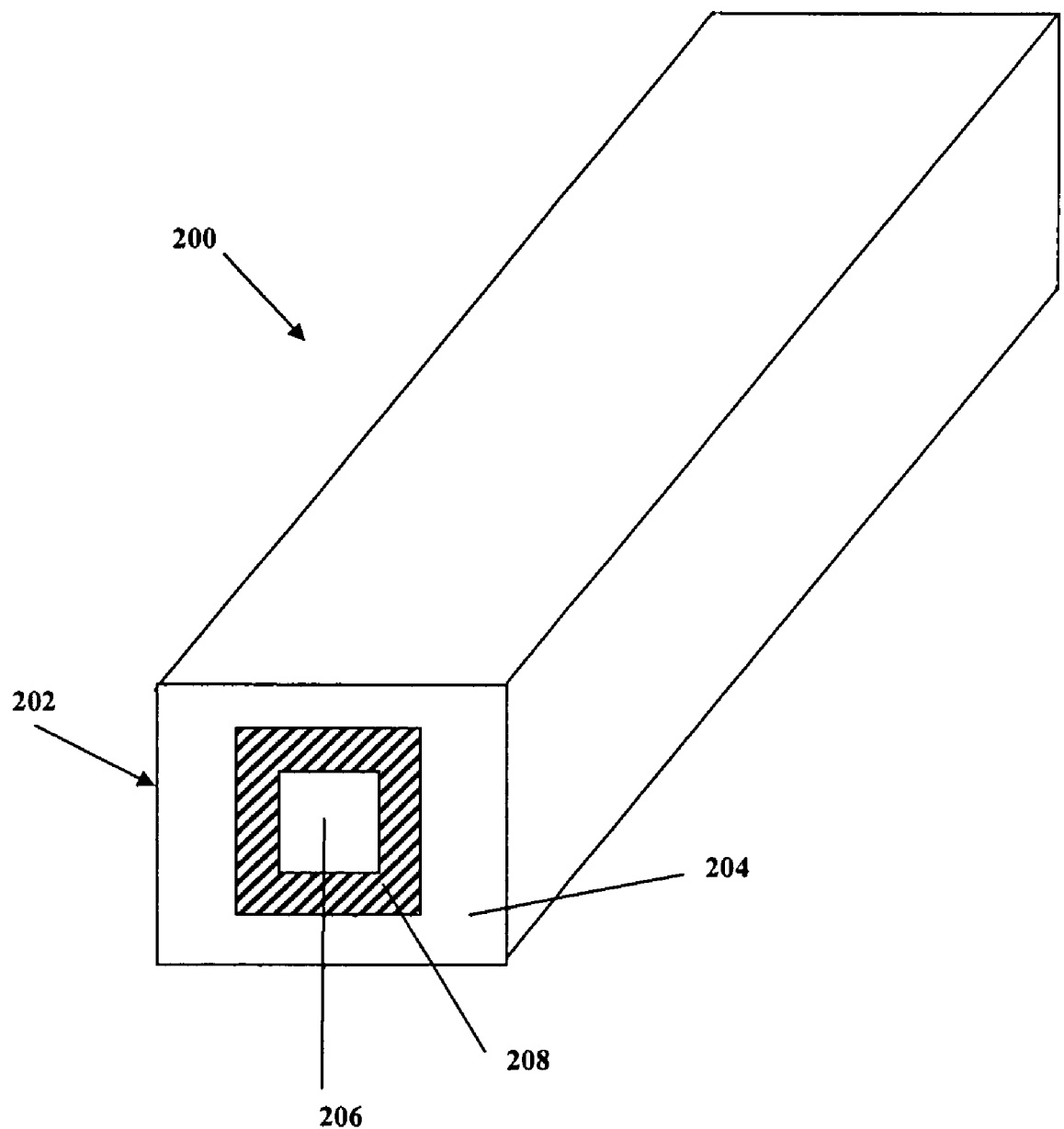
FIG. 2 shows a cross-sectional view of a generally rectangular cross-section retread cushion laminate.
Figure 3:
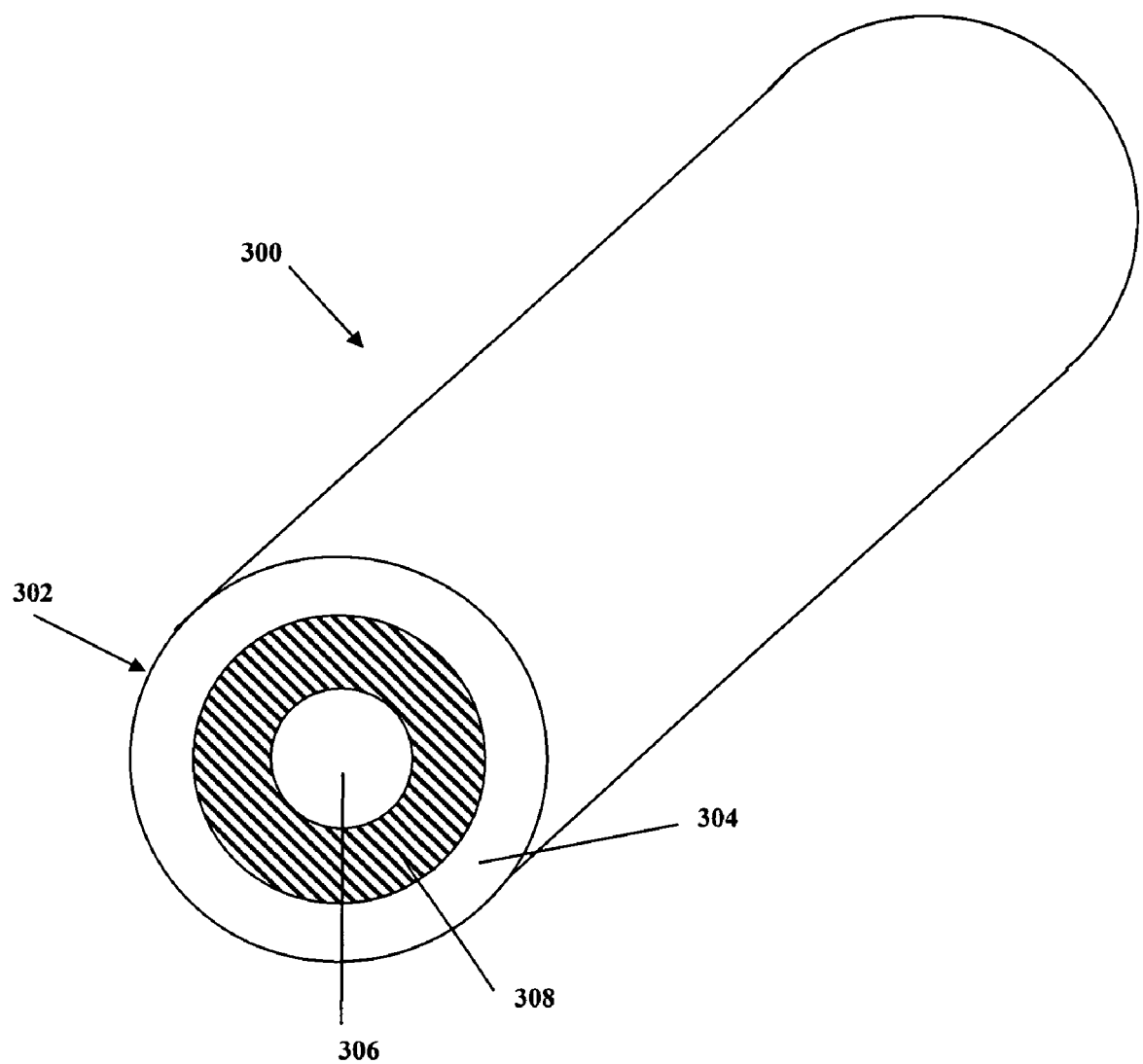
FIG. 3 shows a cross-sectional view of a generally round cross-section retread cushion laminate.

The layers of the retread cushion laminate may be configured in any manner that maintains separation between the first and second layers, with the intermediate layer between the first and second layers. In one embodiment, the retread cushion laminate may be configured with parallel stacked layers, with the intermediate layer sandwiched between the first and second layers. In one embodiment, the retread cushion laminate may be configured nested layers, with one of the first or second layers being the outermost layer, the other of the first or second layers being the innermost layer, and the intermediate layer disposed between the two. Two embodiment of such nested configuration are illustrated in FIGS. 2 and 3. Such nested configurations as illustrated in FIGS. 2 and 3 have the advantage of eliminating the possibility that the first and second layer might come into contact during storage of retread cushion laminate, thus maximizing the shelf life of the retread cushion laminate.

In one embodiment, the retread cushion laminate may be as illustrated in FIG. 2. FIG. 2 shows retread cushion laminate 200 having a rectangular cross section 202 with nested layers. First layer 204 is shown as the outer layer in the nested layers, with second layer 206 the innermost layer and intermediate layer 208 disposed between the first and second layers. Alternatively, the arrangement of the first and second layers 204, 206 may be reversed, with the second layer 206 outermost and the first layer 204 innermost. Retread cushion laminate 200 is of indeterminate length, with the length determined by the storage capacity of the means used to store the retread cushion laminate.

In one embodiment, the retread cushion laminate may be as illustrated in FIG. 3. FIG. 3 shows retread cushion laminate 300 having a round cross section 302 with nested layers. First layer 304 is shown as the outer layer in the nested layers, with second layer 306 the innermost layer and intermediate layer 308 disposed between the first and second layers. Alternatively, the arrangement of the first and second layers 304, 306 may be reversed, with the second layer 306 outermost and the first layer 304 innermost. Retread cushion laminate 300 is of indeterminate length, with the length determined by the storage capacity of the means used to store the retread cushion laminate.

It is to be understood that additional embodiments of a retread cushion laminate with nested layers are possible, for example, with additional layers disposed within or outside the first, second and intermediate layers; it is also contemplated to allow a void at the innermost position in the nested configuration.

The retread cushion laminate may be stored prior to use. In one embodiment, the retread cushion laminate may be stored as a coil on a spool, for example, following the methods as disclosed in U.S. Pat. Nos. 6,330,984 or 6,719,236. In another embodiment, the retread cushion laminate may be stored in a festooned arrangement in a carton, for example, following the methods as disclosed in U.S. Pat. No. 6,341,771. The nested laminate configurations as shown in FIGS. 2 and 3, for example, are best suited for spooling or festooning. Since the innermost layer (206, 306) containing curatives is completely encompassed by the intermediate layer (208, 308) and outer layer (204, 304), there is virtually no possibility that the innermost and outermost layers will come into contact upon spooling or festooning of the retread cushion laminate for storage, thus further reducing the likelihood of premature vulcanization by contact of the separated curatives and increasing the shelf life of the retread cushion laminate.

Upon mixing the retread cushion laminate, a rubber cushion composition or compound is formed and is applicable to a tire carcass as a cushion layer. Again referring to FIG. 1, the cushion layer 102 may be applied directly onto the carcass 106 preferably using an extruder to extrude the cushion laminate, thereby mixing the first, second and intermediate layers to form a productive cushion layer compound. One example of an extruder suitable for use is manufactured by A-Z Formen- und Maschinenbau GmbH, Munchen, Germany and is illustrated in U.S. Pat. No. 6,089,844. Another example of an extruder suitable for applying cushion gum to the carcass is shown in U.S. Pat. No. 5,342,473 to Steelastic. The cushion layer may be applied in strips or may be applied in a single large strip.

It is to be understood that the composition of the first, second, and intermediate rubber layers is not critical, except for the separation of curatives in the first and second layers, and the optional presence of a vulcanization inhibitor in the intermediate layer. In one embodiment, the composition of the first, second, and intermediate layers is identical, except for the separation of curatives in the first and second layers, and the optional presence of a vulcanization inhibitor in the intermediate layer. In other embodiments, the compositions of the first, second and intermediate layers are unique with variations in elastomers, fillers, and additives as is needed to meet processing requirements as are known to one skilled in the art. The amount of curatives in the first and second layers is set so as to result in the desired concentration of curatives in the cushion compound obtained upon mixing the retread cushion laminate.

The rubber cushion composition resulting from the mixing of the first, second, and intermediate layers may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form styrene-butadiene rubber (SBR), as well as vinyl esters and various unsaturated aldehydes, ketones and ethers, e.g., acrolein, methyl isopropenyl ketone and vinylethyl ether. Specific examples of synthetic rubbers include neoprene(polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer." The rubber cushion composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 Parts, 2003, 62nd edition, published by the Institute of Petroleum, United Kingdom.

The rubber cushion composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N347, N351, N358, N375, N539, N550, N582, N630, N642, N650, N683, N754, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber cushion composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber cushion composition may contain a conventional sulfur containing organosilicon compound. Examples of suitable sulfur containing organosilicon compounds are of the formula:

$$Z\text{-Alk-}S_n\text{-Alk-}Z \qquad \text{I}$$

in which Z is selected from the group consisting of

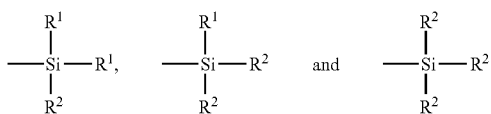

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula I, Z may be

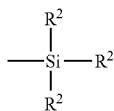

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(\!=\!O)\!-\!S\!-\!CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber cushion composition would be compounded by methods generally known in the rubber compounding art, such as mixing the various sulfur-vulcanizable constituent rubbers with various commonly used additive materials such as, for example, sulfur donors (from the first rubber layer), curing aids, such as accelerators (from the second rubber layer) and inhibitors (optionally, from the intermediate rubber layer) and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors (from the first rubber layer) include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Antiozonants and antioxidants may be referred to as a group as antidegradants. Typical amounts of fatty acids, if used, which can include stearic acid comprise about 0.5 to about 3 phr. Typical amounts of zinc oxide comprise about 2 to about 8 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators (from the second rubber layer) are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

In one embodiment, the optional vulcanization inhibitor (from the intermediate rubber layer) includes nitroso compounds, phthalimides, anhydrides and acids. In one embodiment, the vulcanization inhibitor includes N-nitroso diphenylamine, polynitroso-2,2,4-trimethyl-1,2-dihydroquinoline, N-cyclohexyl thiophthalimide, phthalic anhydride, salicylic acid, and benzoic acid.

In one embodiment, the intermediate layer may comprise from about 1 to about 10 parts by weight, per 100 parts by weight of elastomer (phr), of the vulcanization inhibitor. In another embodiment, the intermediate layer may comprise from about 2 to about 8 phr of vulcanization inhibitor.

The retreaded pneumatic tire of the present invention may be a passenger tire, aircraft tire, agricultural, earthmover, off-the-road, truck tire, and the like. The tire may also be a radial or bias.

Vulcanization of the cushion compound is generally carried out at conventional temperatures ranging from about 100° C. to 200° C.

The invention is further illustrated by the following non-limiting example.

EXAMPLE 1

In this example, the effect of separating curatives into first and second layers of a retread cushion laminate is illustrated. Two retread cushion laminates, laminates A and B were constructed with first, intermediate, and second layers oriented successively parallel to each other in a stack. Curatives were distributed into the first and second layers, as shown Tables 1 and 2, with amounts given in phr. In laminate A, each of the first, intermediate and second layers were of equal thickness of 0.125 inches. In laminate B, each of the first and second layers were of equal thickness of 0.1575 inches, and the intermediate layer was 0.06 inches. Each laminate and the control had a cross section of 2.25 inches by 0.375 inches, and a length of about 10 feet. The control sample had curatives and sulfur mixed with all other ingredients.

The laminates and control sample were stored and tested for scorch safety, compound viscosity and cure (T80) at various times during storage as shown in Table 3. Each sample was mixed before testing using a laboratory mill. Scorch was determined by Mooney Scorch at 121° C. according to ASTM D1646. Viscosity was determined by ML 1+4 at 100 C according to ASTM D1646. $T_{80}$ was determined by ODR rheometry according to ASTM D2048.

TABLE 1

Laminate A

| Layer | Control | First | Intermediate | Second |
|---|---|---|---|---|
| Thickness, inches | 0.375 | 0.125 | 0.125 | 0.125 |
| Elastomers | 100 | 100 | 100 | 100 |
| Carbon Black | 40 | 40 | 40 | 40 |
| Tackifier Resin | 4 | 4 | 4 | 4 |
| Process Oil | 10 | 10 | 10 | 10 |
| Antidegradants | 3 | 3 | 3 | 3 |
| Stearic Acid | 1 | 1 | 1 | 1 |
| Zinc Oxide | 6 | 6 | 6 | 6 |
| Accelerators | 1.48 | 4.44 | 0 | 0 |
| Sulfur | 2.24 | 0 | 0 | 6.72 |

TABLE 2

Laminate B

| Layer | Control | First | Intermediate | Second |
|---|---|---|---|---|
| Thickness, inches | 0.375 | 0.1575 | 0.06 | 0.1575 |
| Elastomers | 100 | 100 | 100 | 100 |
| Carbon Black | 40 | 40 | 40 | 40 |
| Tackifier Resin | 4 | 4 | 4 | 4 |
| Process Oil | 10 | 10 | 10 | 10 |
| Antidegradants | 3 | 3 | 3 | 3 |
| Stearic Acid | 1 | 1 | 1 | 1 |
| Zinc Oxide | 6 | 6 | 6 | 6 |
| Accelerators | 1.48 | 3.52 | 0 | 0 |
| Sulfur | 2.24 | 0 | 0 | 5.34 |

TABLE 3

| Sample | Control | Laminate A | Laminate B |
|---|---|---|---|
| Scorch T + 5, minutes Storage Time | | | |
| 36 days | 8.67 | 16.1 | 13.22 |
| 62 days | 7.35 | 10.02 | 10.02 |
| 98 days | 6.27 | 9.7 | 7.88 |
| Viscosity, Mooney units Storage Time | | | |
| 36 days | 30 | 36.5 | 37.9 |
| 62 days | 30.3 | 36.6 | 38 |
| 98 days | 31.4 | 37.2 | 38.6 |
| ODR $T_{80}$, minutes Storage Time | | | |
| 36 days | 5.62 | 18.34 | 16 |
| 62 days | 5.26 | 10.41 | 8.81 |
| 98 days | 4.75 | 9.1 | 11.21 |

As seen in Table 3, each of Laminates A and B showed better scorch safety, viscosity and $T_{80}$ than control over the entire storage period, indicating significantly less reaction of the curatives during storage. Such improvement in these parameters indicates that the shelf life for a retread cushion laminate is much greater than that for a conventionally pre-mixed cushion compound, with reduced need for refrigeration to prevent premature vulcanization of the compound. Additionally, the ability the separate the curatives into the first and second layers allows the use in the retread cushion laminate of much higher concentrations of curatives or faster curing curatives, which in conventional premixed cushion compounds would result in unacceptable levels of premature vulcanization. The use of such higher curative concentrations or fasting curing curatives will allow faster cures of the cushion compound resulting from mixing of the retread cushion laminate, resulting in reduced cycle time for retreading of tires and reduced costs.

While certain representative embodiments and details have been shown for the purpose of illustrating the invention, it will be apparent to those skilled in this art that various changes and modifications may be made therein without departing from the spirit or scope of the invention.

What is claimed is:

1. A method of retreading a tire, comprising the steps of:
    A) mixing a tire retread cushion laminate to form a cushion compound, the tire retread cushion laminate comprising a first rubber layer, a second rubber layer, and an intermediate rubber layer disposed between the first and second rubber layers such that the first and second rubber layers do not meet;
    the first rubber layer consisting of at least one diene based elastomer, a sulfur donor, and at least one additive selected from the group consisting of sulfur containing organosilicon compounds, carbon black, silica, oils, resins, plasticizers, fillers, pigments, fatty acid, zinc oxide, waxes, antioxidants, antiozonants, and peptizing agents;
    the second rubber layer consisting of at least one diene based elastomer, a vulcanization accelerator, and at least one additive selected from the group consisting of sulfur containing organosilicon compounds, carbon black, silica, oils, resins, plasticizers, fillers, pigments, fatty acid, zinc oxide, waxes, antioxidants, antiozonants, and peptizing agents;
    the intermediate rubber layer comprising a vulcanization inhibitor;

B) applying the cushion compound to a tire carcass; and

C) applying a tread portion to the cushion compound.

2. The method of claim 1, wherein the first, intermediate, and second rubber layers are configured as nested layers; the first rubber layer being the outermost layer of the first, intermediate, and second rubber layers; the second rubber layer being the innermost layer of the first, intermediate, and second rubber layers; wherein the first rubber layer in cross-section surrounds the intermediate and second rubber layers, and the intermediate rubber layer in cross-section surrounds the second rubber layer.

3. The method of claim 2, wherein the step of mixing the tire retread cushion laminate comprises extruding the tire retread cushion laminate.

4. The method of claim 1, wherein the first, intermediate, and second rubber layers are configured as nested layers; the second rubber layer being the outermost layer of the first, intermediate, and second rubber layers; the first rubber layer being the innermost layer of the first, intermediate, and second rubber layers; wherein the second rubber layer in cross-section surrounds the intermediate and first rubber layers, and the intermediate rubber layer in cross-section surrounds the first rubber layer.

5. The method of claim 4, wherein the step of mixing the tire retread cushion laminate comprises extruding the tire retread cushion laminate.

6. The method of claim 1, wherein the vulcanization inhibitor is present in the intermediate layer in an amount ranging from 1 to 10 phr.

7. The method of claim 1, wherein the vulcanization inhibitor is present in the intermediate layer in an amount ranging from 2 to 8 phr.

8. The method of claim 1, wherein the vulcanization inhibitor is selected from the group consisting of N-nitroso diphenylamine, polynitroso-2,2,4-trimethyl-1,2-dihydroquinoline, N-cyclohexyl thiophthalimide, phthalic anhydride, salicylic acid, and benzoic acid.

9. The method of claim 1, wherein the sulfur donor is selected from the group consisting of elemental sulfur, amine disulfides, polymeric polysulfides and sulfur olefin adducts.

10. The method of claim 1, wherein the vulcanization accelerator is selected from the group consisting of amines, disulfides, guanidines, thioureas, thiazoles, thiurams, sulfenamides, dithiocarbamates and xanthates.

11. The method of claim 1, wherein the diene based elastomer of the first rubber layer or the second rubber layer is selected from the group consisting of natural rubber, synthetic polyisoprene rubber, polybutadiene rubber, and styrene-butadiene rubber.

12. The method of claim 1, wherein the first, intermediate, and second rubber layers are configured as nested layers of round cross-section.

* * * * *